(12) United States Patent
Mine et al.

(10) Patent No.: US 7,316,511 B2
(45) Date of Patent: Jan. 8, 2008

(54) OPTICAL COUPLING COMPONENT FOR USE IN AN OPTICAL COMMUNICATION CONNECTOR AND AN OPTICAL CONNECTOR USING SUCH OPTICAL COUPLING COMPONENT

(75) Inventors: Keiji Mine, Osaka (JP); Hiroshi Nakagawa, Kyoto (JP); Takeshi Isoda, Osaka (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 11/264,914

(22) Filed: Nov. 1, 2005

(65) Prior Publication Data

US 2006/0093288 A1 May 4, 2006

(30) Foreign Application Priority Data

Nov. 4, 2004 (JP) ............................. 2004-320368
Oct. 27, 2005 (JP) ............................. 2005-313275

(51) Int. Cl.
*G02B 6/36* (2006.01)
(52) U.S. Cl. ...................................... 385/92
(58) Field of Classification Search ............ 385/88–94, 385/49
See application file for complete search history.

(56) References Cited

U.S. PATENT DOCUMENTS

| 6,459,835 B1 | 10/2002 | Nagaoka et al. |
| 2002/0071639 A1 | 6/2002 | Kropp |
| 2004/0114881 A1 | 6/2004 | Wilson |

FOREIGN PATENT DOCUMENTS

| JP | 2000-304980 | 11/2000 |
| JP | 2001-133665 | 5/2001 |

*Primary Examiner*—Sarah Song
(74) *Attorney, Agent, or Firm*—David N. Lathrop; Larry Mendenhall; Gallagher & Lathrop

(57) ABSTRACT

An optical coupling component for use in an optical communication connector is provided which comprises a pair of columnar sending side and receiving side optical functional sections and a joint section integrally molded with the optical functional sections and made from the same material as the material of the optically functional sections and having joint regions adjoining the side walls of the optical functional sections, the joint regions of the joint section having a circumferential length along the side walls of the optically functional sections which is equal to or less than a half circumference of the optically functional sections.

9 Claims, 14 Drawing Sheets

OPTICAL COUPLING COMPONENT FOR USE IN AN OPTICAL COMMUNICATION CONNECTOR AND AN OPTICAL CONNECTOR USING SUCH OPTICAL COUPLING COMPONENT

BACKGROUND OF THE INVENTION

1. Field of the Invention

This invention relates to an optical coupling component for optically coupling a light-emitting element and a light-receiving element on one hand and optical fibers on the other hand for two-way optical communication connector, which is designed in a quest to enhance the efficiency in transmission of optical power as well as to reduce cross-talk, and an optical connector using such optical coupling component.

2. Prior Art

An optical plug holding optical fibers, and an optical connector having an optical coupling component for use in two-way optical communication and a light-emitting element and a light-receiving element mounted therein are coupled together to form a two-way optical communication connector assembly.

Prior art references include Japanese Patent Application Laid Open No. 2000-304980 (issued on Nov. 2, 2000, referred to as literature 1 hereinafter) and Japanese Patent Application Laid Open No. 2001-13665 (issued on May 18, 2001, referred to as literature 2 hereinafter) which disclose integrated-type optical coupling components for use in two-way optical communications comprise a sending side optically functional section and a receiving side optically functional section integrally connected together by means of a joint section, and optical connectors utilizing such components.

However, the optical coupling components disclosed in the literatures 1 and 2 are ones integrally molded by using a two color molding technique, which comprise a pair of optically functional sections, and a pair of tubular protective sleeves and a joint section which sleeves and a joint section are made from a material different from the material of which the optically functional sections are made, this leads to an increased cost of manufacture.

Further, there is an unpublished earlier technique which has been developed in a facility of the assignee company of the present application and which concerns to a discrete-type optical coupling component, an integrated-type optical coupling component, and optical connectors utilizing such components which are disclosed in Japanese Patent Application No. 2004-260882 (filed on Sep. 8, 2004, referred to as unpublished literature 3 hereinafter) and corresponding U.S. application and other foreign applications.

The yet publicly unknown earlier technique disclosed in the aforesaid unpublished literature 3 relating to the integrated-type optical coupling component for use in two-way optical communication will now be briefly described with reference to FIGS. 12 and 13.

In FIGS. 12 and 13, the reference numeral 107 denotes an optical coupling component for use in a two-way optical communication connector which is called sleeve unit in this unpublished literature 3. Accordingly, the term "sleeve unit" will be used in the following explanation:

As illustrated in FIGS. 13A-13E, the sleeve unit 107 comprises a columnar sending side optically functional section 181, a receiving side optically functional section 182, a sending side sleeve 173 for positioning and protecting the sending side optically functional section 181, a receiving side sleeve 174 for positioning and protecting the receiving side optically functional section 182, a joint section 170 interconnecting the sending side and receiving side optically functional sections 181 and 182 together, a sending side flange 171 surrounding the end portion 181a of the sending side optically functional section 181 on the light-emitting element side, and a receiving side flange 172 surrounding the end portion 182a of the receiving side optically functional section 182 on the light-receiving element side. These joint section 170, optically functional sections 181, 182, sleeves 173, 174 and flanges 171, 172 are integrally molded and made from an optically transparent (light-transmissive) synthetic resin such as acrylic material or the like, for example.

An optical coupling component 101 utilizing the sleeve unit 107 will be described with reference to FIGS. 12 to 14.

In FIG. 12, the reference numeral 110 denotes a receptacle which comprises a side wall 102 and a bottom wall 103. In an optical plug receiving recess 102a defined by the side wall 102 of the receptacle 110, a cylindrical sending side optical fiber accommodating tube 111 and a cylindrical receiving side optical fiber accommodating tube 112 extend in parallel to the side wall 102 and integrally upwardly from and perpendicularly to the bottom wall 103. The bottom wall 103 has a pair of apertures 113a and 113b formed therethrough communicating with the sending side optical fiber accommodating tube 111 and receiving side optical fiber accommodating tube 112, respectively and is further formed with an optical coupling component accommodating recess 113 in the outside surface (under surface of the bottom wall 103 as viewed in FIG. 12A).

The reference numeral 104 denotes a shield cover which is divided (vertically as viewed in FIG. 12A) by a partition 140 into two portions, a lower element accommodating portion 141 for housing an element holder 105 and an upper receptacle accommodating portion 142 for housing the receptacle 110. The partition 140 is formed in its central portion with openings 140a and 140b. Suitably mounted in the element holder 105 are a light-emitting element 161 and a light-receiving element 162.

The sending side optical fiber 131 is inserted into the optical plug receiving recess 102a of the receptacle 110 from the top side as viewed in FIG. 12A and fitted and held in place in the sending side optical fiber accommodating tube 111 by means of a sending side fiber ferrule 121. Likewise, the receiving side optical fiber 132 is fitted into the receiving side optical fiber accommodating tube 112 from the top side and held therein in place by means of a receiving side fiber ferrule 122.

The sleeve unit 107 is inserted upwardly from outside of the bottom wall 103 (from the underside of the bottom wall 103 as viewed in FIG. 12A) such that the sending side sleeve 173 is passed through the aperture 113a and fitted and positioned in the sending side optical fiber accommodating tube 111 while the receiving side sleeve 174 is likewise passed through the aperture 113b and fitted and positioned in the receiving side optical fiber accommodating tube 112 until the joint section 170 is received in the recess 113, as shown in FIG. 12B. At this position, it is seen that the sending side flange 171 and the receiving side flange 172 extend beyond the surface (undersurface as viewed in FIG. 12B) of the bottom wall 103.

As is seen from FIG. 14 illustrating the sleeve unit 107 fitted in the receptacle 110 as viewed from the sleeve unit side, the recess 113 is so shaped as to be generally complementary with the outer contour of the sleeve unit 107 (defined by the flanges 171, 172 and the joint section 170).

The recess 113 is formed on its inner wall surface with ridges 114 (three in this example) of a semi-spherical shape in cross-section extending in the direction of the depth of the recess 113.

The sleeve unit 107 is press-fitted and held in place in the recess 113 such that these three ridges 114 are compressed against the wall of the recess. It is also to be noted that the sleeve unit 107 has a contoured projection 170a whereby the sleeve unit 107 is positioned in place within the recess 113.

Then, the receptacle 110 with the sending side optical fiber 131 and the receiving side optical fiber 132 incorporated therein is accommodated in the upper receptacle accommodating portion 142 of the shield cover 104 such that the sending side flange 171 and the receiving side flange 172 are inserted through the openings 140a, 140b of the partition 140 into the element accommodating portion 141 housing the light-emitting element 161 and the light-receiving element 162 with the end portions 181a and 182a of the optically functional sections 181 and 182 opposing the light-emitting element 161 and the light-receiving element 162, respectively.

It should be noted here that a sending side optical signal emitted from the light-emitting element 161 enters the end portion 181a of the sending side optically functional section 181 on the light-emitting element side. The end portion 181a of the sending side optically functional section 181 is provided at its end face (lower end as viewed in FIG. 13C) with a collimating lens 181b. Thus, the incident sending side optical signal passes through the collimating lens 181b and propagates through the sending side optically functional section 181, goes out of the section through a collimating lens 181d formed on the end face (the upper end as viewed in FIG. 13C) of the end portion 181c of the optically functional section 180 on the optical fiber side, and converges onto and enters the core end face of the sending side optical fiber 131. Thereafter, the sending side optical signal passes through the sending side optical fiber 131 and is sent out to the outside.

Reversely, a receiving side optical signal incoming through the receiving side optical fiber 132 from the outside will enter the receiving side optically functional section 182 through a collimating lens 182d formed on the end face (the upper end as viewed in FIG. 13C) of the end portion 182c of the receiving side optically functional section 182 and then enters and is received by the light-receiving element 162 through a collimating lens 182b formed on the end face (the lower end as viewed in FIG. 13C) of the end portion 182a of the optically functional section adjacent the light-receiving element.

With the sleeve unit 107 described above, a sending side optical signal emitted from the light-emitting element 161 enters the sending side optically functional section 181 and is sent out to the outside via the sending side optical fiber 131 while at the same time some of the sending side optical signal readily enters the joint section 170 formed of the same optically transparent (light-transmissive) material as the optically functional sections, so that the signal may leak out from the joint section to the outside, undesirably leading to a transmission loss of the light. The receiving side optical signal incoming through the receiving side optical fiber 132 from the outside and entering the receiving side optically functional section 182 is also involved with a similar leak problem.

In addition, with the sleeve unit 107 described above, it is to be appreciated that since the sending side optically functional section 181 and the receiving side optically functional section 182 are connected together by means of the joint section 170, a portion of the sending side optical signal emitted from the light-emitting element 161 will leak into the joint section 170 and is reflected at the upper and lower interfaces between the joint section and the outside air whereby it may leak into the local light-receiving element 162 via a cross-talk path as indicated by an arrow in FIG. 12B, causing a detrimental cross-talk problem.

SUMMARY OF THE INVENTION

Subjects to be Solved by the Invention

It is an object of this invention to provide an optical coupling component for use in a two-way optical communication connector which is designed to enhance the efficiency in transmission of optical power as well as to reduce cross-talk and an optical connector utilizing such component.

Means by which to Solve the Subjects

In order to accomplish the object, in an attempt to provide an optical coupling component comprising a pair of optically functional sections for a two-way optical communication and a joint section integrally formed with the optically functional sections, the present invention contemplates to construct the optical coupling component in such a manner that a component part or component parts other than the optically functional sections (such as joint sections, positioning members, protecting members, or others), that is, those parts which perform functions other than an optical waveguide and which are to be contacted with the optically functional sections, should be joined with the optically functional sections at surface areas as small as possible.

Specifically, according to this invention, a joint section is made from the same material as a columnar sending side optically functional section and a columnar receiving side optically functional section and integrally molded with the optically functional sections in a manner such that the joint section has at opposite ends thereof joint regions which are joined with the optically functional sections. Each of those joint regions of the joint section adjoining the side walls of the optically functional sections has to have a circumferential length which is determined to be equal to or less than a half circumference of the corresponding columnar optically functional sections.

In one embodiment, an optical coupling component is defined, which comprises a columnar sending side optical functional section and a columnar receiving side optical functional section in a pair, both made from optically transparent synthetic resin material, and a joint section integrally molded with said optically functional sections and made from the same material as the material from which said optically functional sections are made so that said pair of said optically functional sections are mechanically joined to each other into one piece by means of said joint section, wherein said joint section has a body portion and opposite joint end portions, and each of the joint end portions has a joint region adjoining a circumferential surface of the corresponding columnar optically functional section, the area of said joint region being dimensioned so as to have a circumferential length along a circumferential direction of the corresponding columnar optically functional section equal to or less than a half circumference of the columnar optically functional section.

In another embodiment, the optical coupling component is further defined, wherein said joint regions of said joint end portions of said joint section has a vertical width H that is defined to be less than the vertical width M of said joint section.

In another embodiment, the optical coupling component is further defined, wherein said body portion of said joint section has a generally V-shaped notch in a central portion thereof with an apex lower than a level defined by a straight line extending between the lower sides of said two optically functional sections.

In another embodiment, the optical coupling component is further defined, wherein said body portion of said joint section has generally U-shaped notches in a central portion thereof cut in from the top and bottom edges thereof so that said joint section can be fitted and fixed by the central portion thereof in a receptacle.

In another embodiment, an optical connector is defined, which comprises a light-emitting element and a light-receiving element; the optical coupling component as described above; and a connector body for housing therein said light-emitting and light-receiving elements and said optical coupling component: wherein said columnar sending side and receiving side optically functional sections of said optical coupling component are adapted to establish optical coupling between said light emitting element and said light receiving element on one hand and a sending side optical fiber and a receiving side optical fiber attached to an optical plug on the other hand, respectively.

Effects of the Invention

The optical coupling component for use in a two-way optical communication connector according to this invention is an integrated-type optical coupling component comprising a columnar sending side optically functional section, a columnar receiving side optically functional section, and a joint section molded integrally with the optically functional sections and made from the same material as the material from which the optically functional sections are made so as to join the two optically functional sections together into one piece. With this construction, it is to be appreciated that the surface areas of those joint regions of the joint section adjoining the side walls of the columnar optically functional sections are reduced as compared with that of the optical coupling component obtained from the unpublished earlier technique, whereby the amount of loss of light which may leak through the joint section is suppressed to thereby enhance the optical transmission efficiency. This means that since the optical coupling component for a two-way optical communication connector according to the present invention has a joint section integrated at opposite ends thereof with the sending side and receiving side optically functional sections, the amount of the transmitted light which may penetrate the joint section from the sending side optically functional section is reduced, whereby it also leads to a reduction in cross-talk.

BRIEF DESCRIPTION OF THE DRAWINGS

FIG. 1 is illustrations illustrating a first embodiment of the optical coupling component according to the present invention.

FIG. 2 is illustrations illustrating a modified form of the first embodiment shown in FIG. 1.

FIG. 4 is illustrations illustrating a modified form of the second embodiment shown in FIG. 3.

FIG. 6 is illustrations illustrating the third embodiment of the optical coupling component according to the present invention.

FIG. 7 is illustrations illustrating a modified form of the third embodiment shown in FIG. 6.

FIG. 8 is diagrams illustrating the optical coupling component being assembled into a receptacle as shown in a circle in FIG. 1B.

FIG. 9 is illustrations illustrating a fourth embodiment of the optical coupling component according to the present invention.

FIG. 10 is diagrams illustrating the manner in which an optical connector is assembled using the integrated-type optical coupling component according to the first embodiment shown in FIG. 1.

FIG. 11 is diagrams illustrating a receptacle adapted to fit therein the integrated-type optical coupling component according to the first embodiment shown in FIG. 1.

FIG. 12 is illustrations illustrating an yet unpublished earlier technique.

FIG. 13 is a diagram illustrating an example of the integrated-type optical coupling component according to the yet unpublished earlier technique shown in FIG. 12.

BEST MODES FOR CARRYING OUT THE INVENTION

Figure 1A:
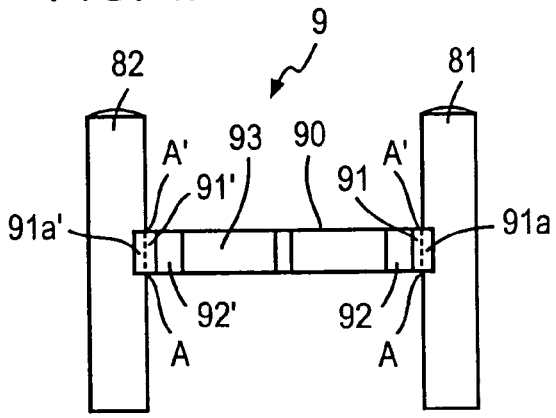
FIG. 1A being a plan view.
Figure 1C:
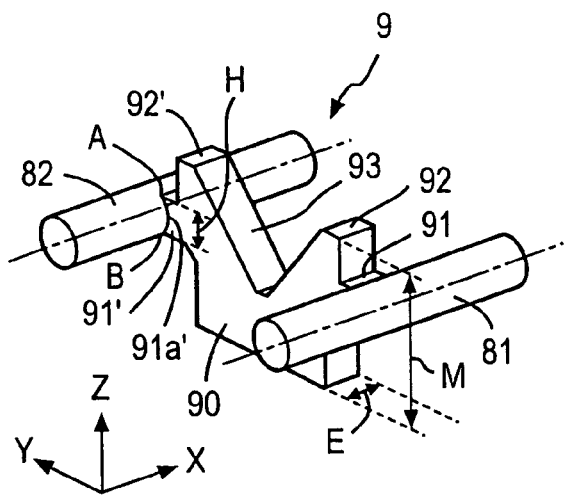
FIG. 1C being a perspective view.
Figure 1B:
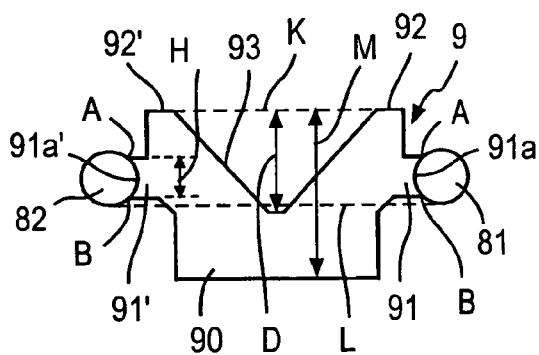
FIG. 1B being a front view.
Figure 1E:
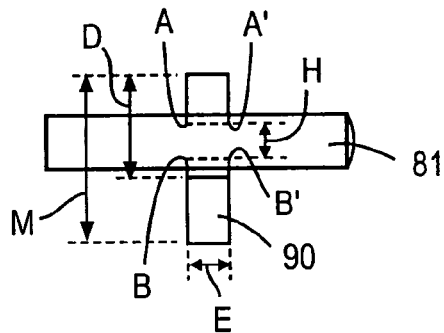
FIG. 1E being a side view.
Figure 1D:
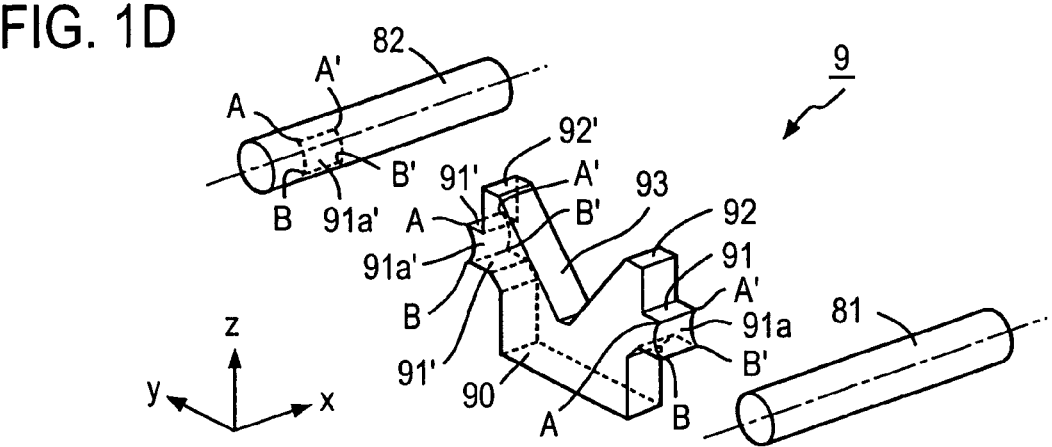
FIG. 1D being a perspective view of the respective elements separated.
Figure 2A:
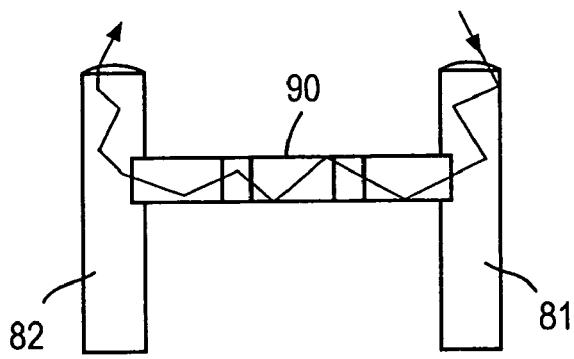
FIG. 2A being a plan view.
Figure 2C:
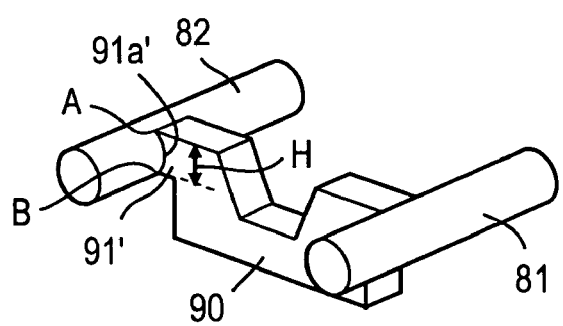
FIG. 2C being a perspective view.
Figure 2B:
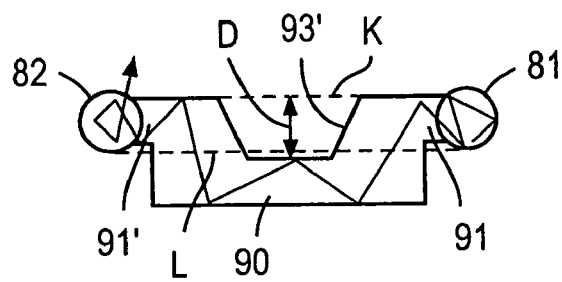
FIG. 2B being a front view.
Figure 2D:
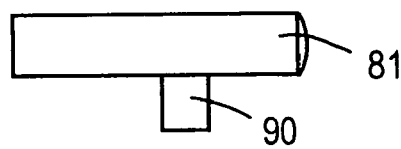
FIG. 2D being a side view.

The best modes for carrying out the present invention will be described with reference to the first embodiment shown in FIG. 1. FIG. 1B is a front view of the optical coupling component having a joint section and optically functional sections; FIG. 1A is a plan view of the optical coupling component as viewed from the top; FIG. 1E is a side view of the component as viewed from the side thereof; and FIGS. 1C and 1D are a perspective view of the component.

In FIG. 1, the reference numeral 9 denotes the optical coupling component for use in a two-way optical communication connector. The optical coupling component 9 comprises a columnar sending side optically functional section 81 and a columnar receiving side optically functional section 82, both made of optically transparent (light-transmissive) synthetic resin, and a joint section 90 for mechanically connecting the two optically functional sections into one piece. It should be understood here that although the joint section is intended to mechanically connect the two optically functional sections together, it will actually act to connect the two optically functional sections optically as well, because it is molded integrally with the optically functional sections and made from the same material as the optically functional sections, which results in lowering the optical transmission efficiency, as already explained.

A sending side optical signal emitted from a light-emitting element (not shown) will enter the sending side optically functional section 81 via its one end portion (81a on the light-emitting element side), propagate through the section and emerge therefrom through the other end portion (81c on the fiber side), followed by passing through a sending side optical fiber (not shown) and being delivered out to the outside. On the other hand, a receiving side optical signal incoming through a receiving side optical fiber (not shown) from the outside will enter the receiving side optically functional section 82 via its one end portion (82c on the fiber side), emerge therefrom through the other end portion (82a on the light-receiving element side), and will enter and be received by a light-receiving element (not shown).

The joint section 90 comprises a body portion 90' and opposite joint end portions 91 and 91' with joint regions 91a and 91a' which are integrally formed with the right or left side wall of the sending side optically functional section 81 and receiving side optically functional section 82, and further includes mounting portions 92, 92' adapted to be press-fitted into a receptacle as will be described hereinbelow, and a notch or cut-out 93 of V-shaped cut deeply in the body portion 90'. It is here to be noted that the joint section 90 has a thickness E as shown in FIGS. 1C and 1E, and the joint end portions 91, 91' have a "vertical width H" which is less than the vertical width M of the body portion 90' of the joint section 90 and which is designed to be less than the diameter of the columnar optically functional sections 81 and 82. Assuming that the direction of extension of the central axes of the sending side and receiving side optically functional sections 81, 82 be X-axis, that the direction perpendicular to those central axes in a plane containing the axes be Y-axis, and that the direction perpendicular to the X-axis and Y-axis be Z-axis, the aforesaid thickness E of the joint section refers to the length in the direction of X-axis while the 'vertical width H' refers to the length in the direction of Z-axis (see FIGS. 1B and 1C).

What is important in the present invention is that the joint end portions 91, 91' of the joint section 90 have joint regions 91a and 91a' adjoining the side walls of the columnar optically functional sections 81, 82 (it is assumed that the joint end portions have joint regions although actually they are formed integrally with the optically functional sections) and that the length (the arcuate length from the point A to the point B in FIGS. 1B, 1C and 1D) of the joint regions of the joint section circumferential of the side walls of the columnar optically functional sections is designed to be equal to or less than a half circumference of the columnar optically functional section on the side wall thereof.

Additionally, the depth D (see FIG. 1B) of the notch 93 in the cut-in direction from the top end line K of the joint section 90 is such that the bottom (apex) of the notch 93 is below the level of a straight line L extending between the lowest points of the sending side and receiving side optically functional sections 81 and 82 (see FIG. 1E).

As noted above, in the optical coupling component according to the present invention, the joint end portions 91, 91' of the joint section 90 are designed to contact the side walls of the columnar sending side and receiving side optically functional sections 81, 82 around the circumferential length equal to or less than a half circumference of their columnar cross-sections. As opposed to this, in the optical coupling component of the unpublished earlier technique described hereinbefore, the joint section is constructed so as to join the side walls of the columnar optically functional sections around their entire circumferences. Comparison between the two shows that in the present invention the areas of the joint regions of the joint section 90 where it adjoins the side walls of the sending side and receiving side optically functional sections 81, 82 are much more significantly reduced in compare to that of the unpublished earlier technique and the amount of light which would otherwise leak through the joint section is much more suppressed to a greater degree, whereby the optical transmission efficiency may be further enhanced. In addition, the depth of the notch 93 from the top of the joint section 90 is such that that the bottom of the notch 93 is below the level defined by a straight line extending between the lowest points of the sending side and receiving side optically functional sections 81 and 82, whereby the path of leakage that any light which may have leaked from the sending side optically functional sections 81 into the joint section 90 will take before it reaches the receiving side optically functional section 82 is extended, so that the leaked light will be attenuated during the process of propagating through the joint section 90 while diffusing, resulting in a reduction in cross-talk.

An example of the two-way optical communication connector constructed by the use of the optical coupling component according to the first embodiment described above will now be described with reference to FIGS. 8A, 10 and 11.

Figure 8A:
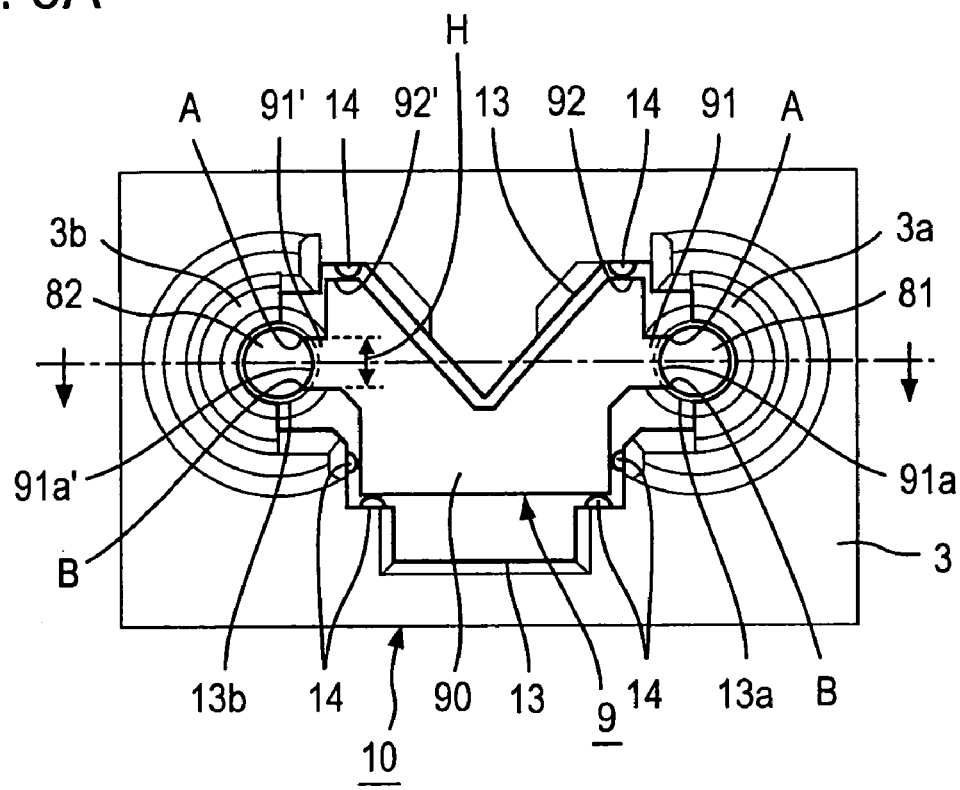
FIG. 8A showing an example of an optical connector in which the optical coupling component according to the first embodiment is used.

FIG. 8A is a front view of the face 3 of the receptacle 10 (the side from which the optical coupling component is inserted into the receptacle) opposing the optical elements, illustrating the optical coupling component 9 according to the first embodiment assembled into the receptacle.

Figure 12A:
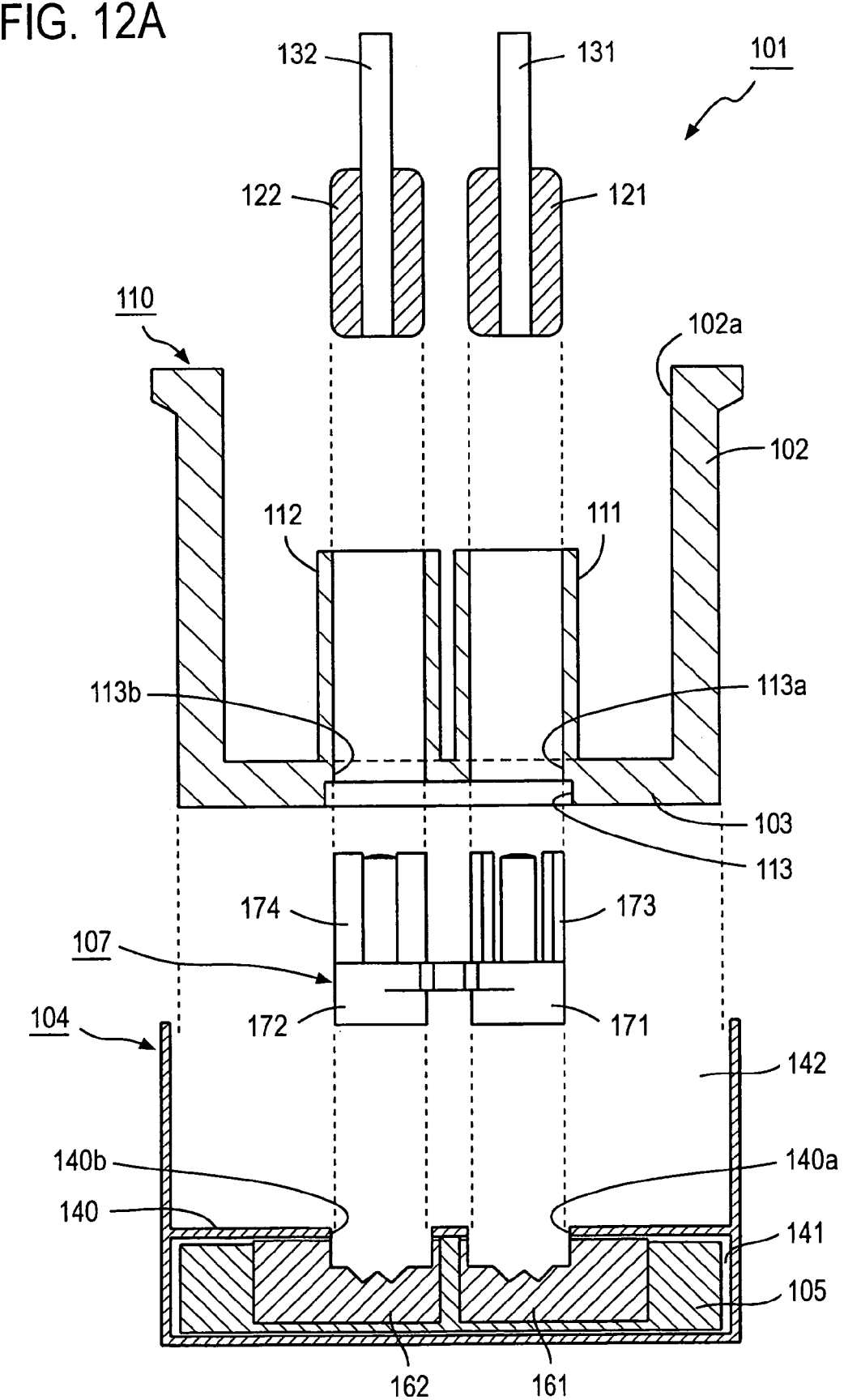
FIG. 12A showing an optical connector in a state before it is assembled using the integrated-type optical coupling component for a two-way optical communication obtained by the earlier technique.
Figure 12B:
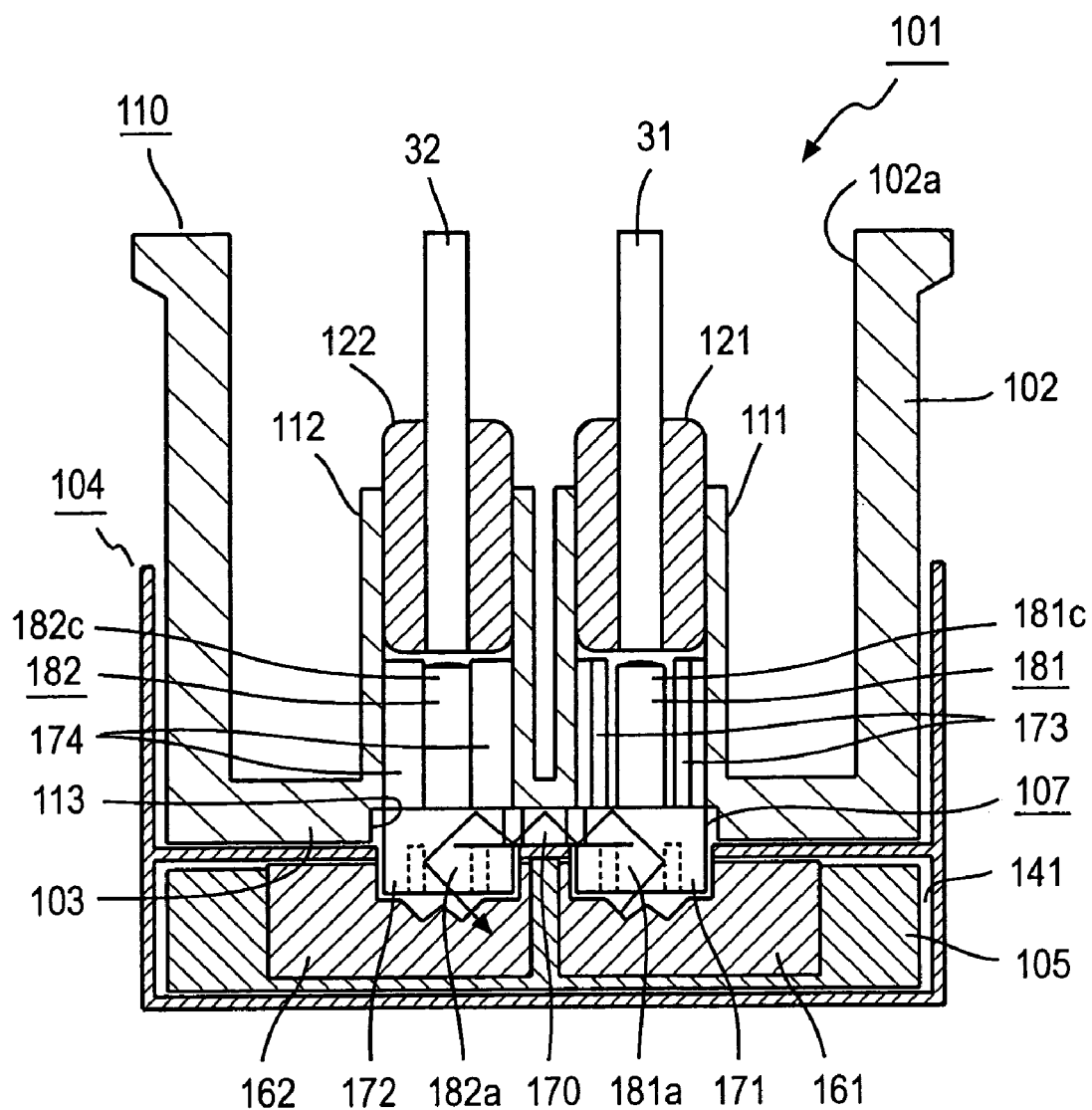
FIG. 12B showing the connector after assembled.
Figure 13A:
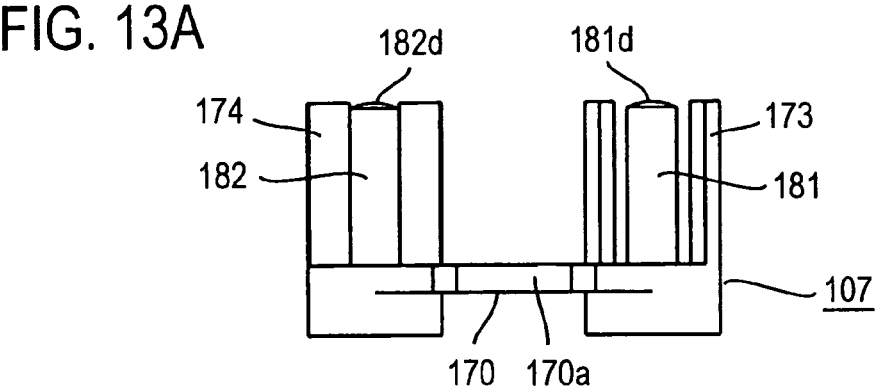
FIG. 13A being a plan view of the optical coupling component.
Figure 13B:
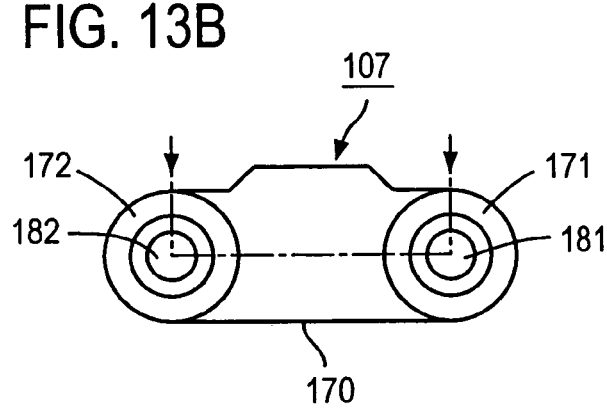
FIG. 13B being a front view.
Figure 13D:
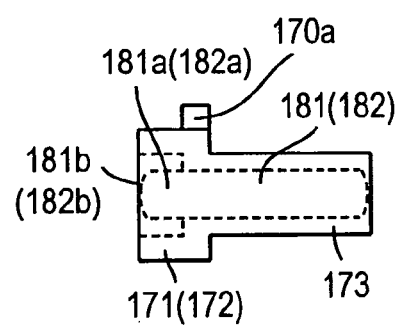
FIG. 13D being a side view.
Figures 13C, 13E:
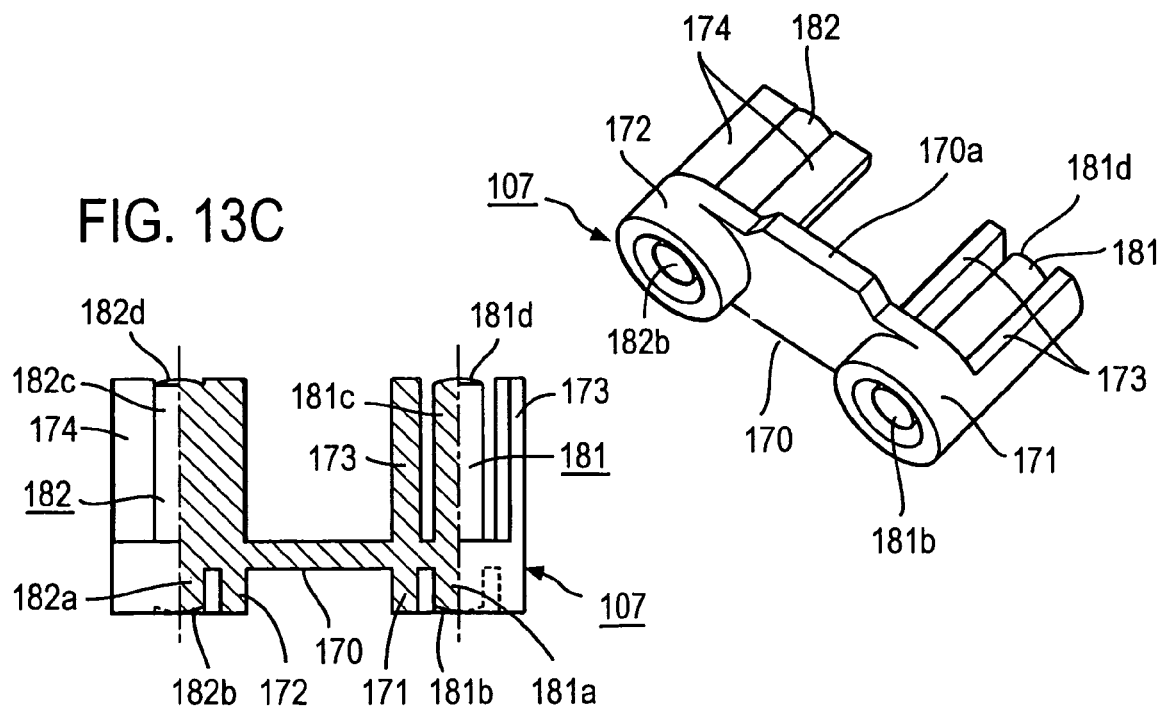
FIG. 13C being a partly cross-sectional view taken along the one-dotted chain line in FIG. 13B.
FIG. 13E being a perspective view.
Figure 14:
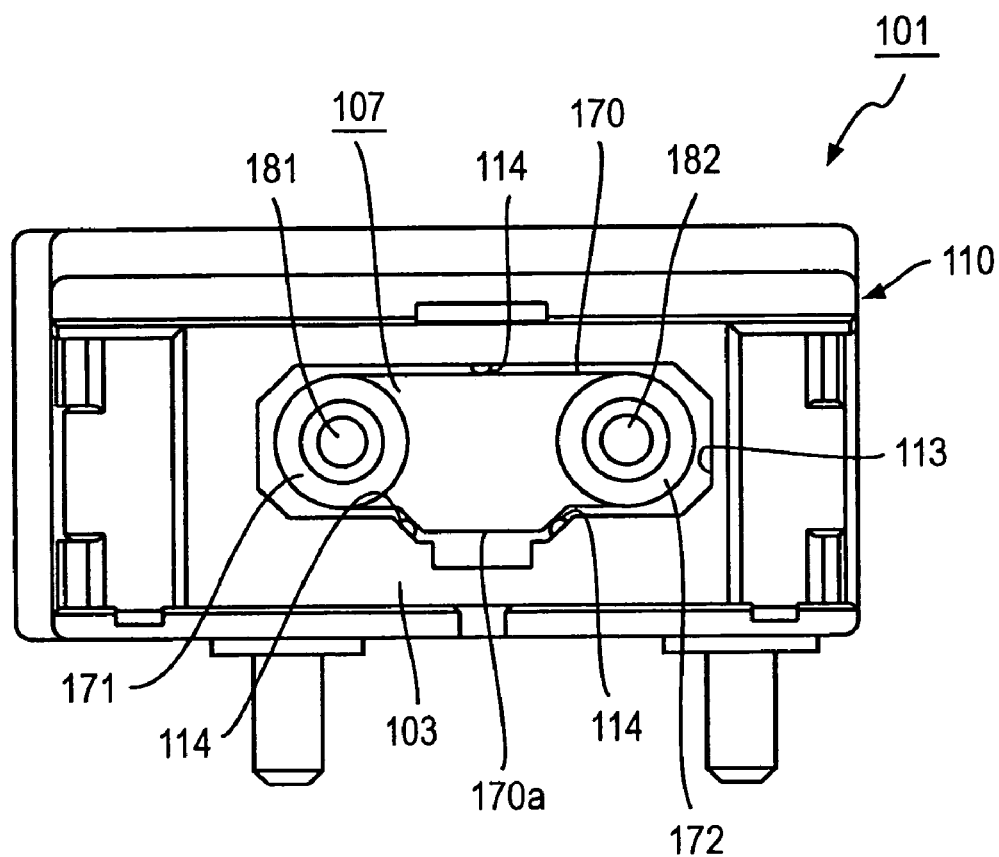
FIG. 14 is an illustration showing the integrated-type optical coupling component according to the yet unpublished earlier technique shown in FIGS. 12 and 13 being assembled into the receptacle.

This drawing corresponds to that of FIG. 14 used to illustrate the unpublished earlier technique. Such receptacle 10 having the optical coupling component 9 fitted therein is assembled with a shield cover 4 (not shown, but the one corresponding to the cover 104 shown in FIG. 12) to complete a connector 1.

FIG. 10 is cross-sectional diagrams illustrating the manner in which the two-way optical communication connector 1 according to the present invention is assembled (for the cross-sectional face refer to FIG. 8A).

FIG. 11 is diagrams illustrating a receptacle 10 for the two-way optical communication connector 1 according to the present invention.

The optical connector 1 according to the present invention comprises a receptacle 10 and a shield cover 4 fitted over the receptacle. The receptacle 10 comprises a side wall 2 and a bottom wall 3. In an optical plug receiving recess 2a defined by the side wall 2 of the receptacle 10, a cylindrical sending side optical fiber accommodating tube 11 and a cylindrical receiving side optical fiber accommodating tube 12 extend in parallel to the side wall and integrally upwardly from and perpendicularly to the bottom wall 3 (see FIGS. 10A and 11A). The bottom wall 3 refers to a wall which corresponds to the bottom of the recess 2a as viewed inlet opening of the recess 2a.

Figure 10A:
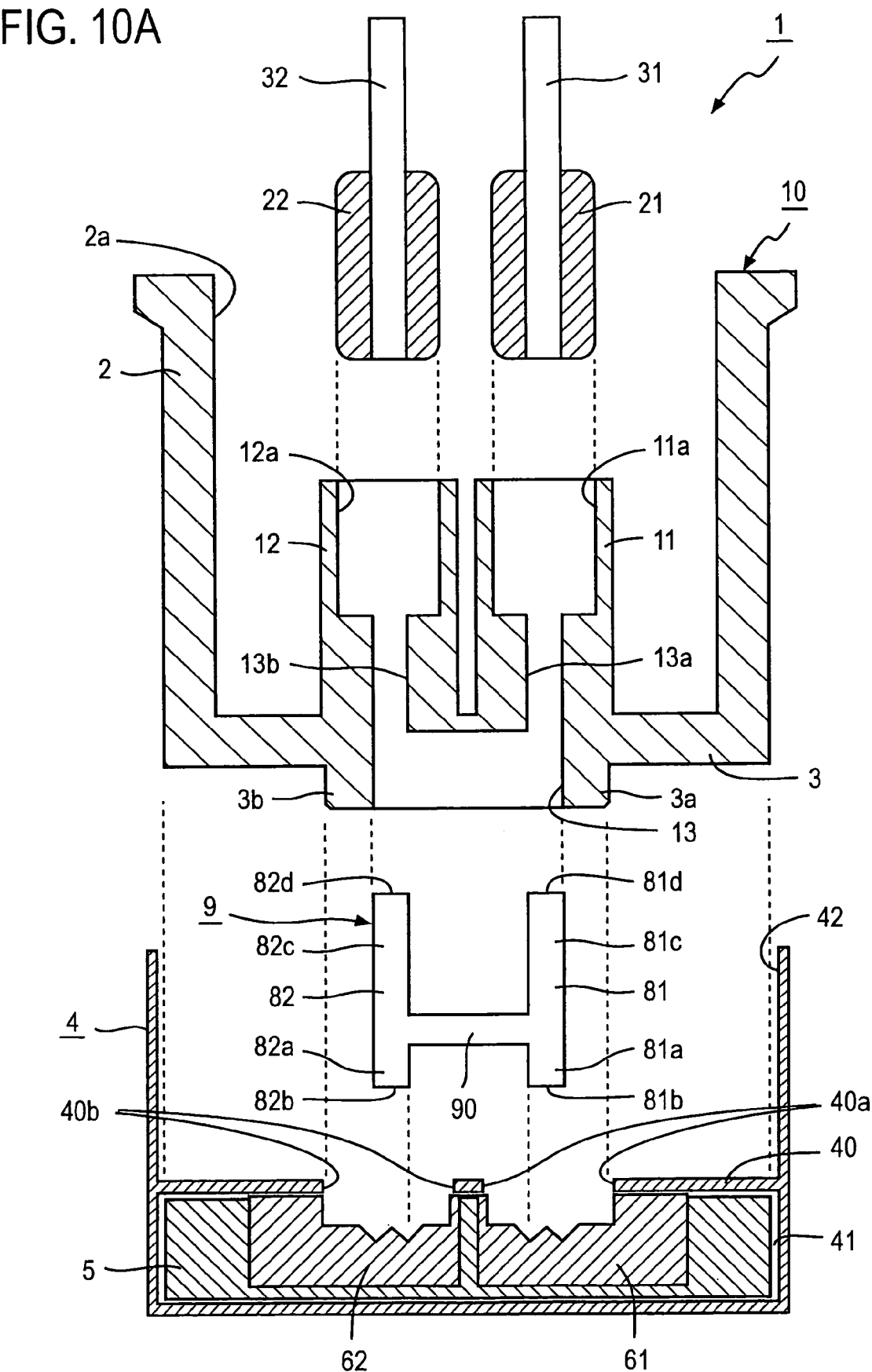
FIG. 10A showing the parts of the connector in a state before assembly.

The bottom wall 3 has a pair of apertures 13a and 13b formed therethrough communicating with the sending side optical fiber accommodating tube 11 and receiving side optical fiber accommodating tube 12, respectively and is further formed with an optical coupling component accommodating recess 13 in the outside surface (under surface of the bottom wall 3 as viewed in FIG. 10A) (see FIGS. 8A and 10A).

The shield cover 4 is divided (vertically as viewed in FIG. 10A) by a partition 40 into two portions, a lower optical element accommodating portion 41 for housing an optical element holder 5 and an upper receptacle accommodating portion 42 for housing the receptacle 10. The partition 40 is formed in its central portion with openings 40a, 40b. Suitably mounted in the element accommodating portion 41 of the element holder 5 are a light-emitting element 61 and a light-receiving element 62.

A sending side optical fiber 31 is inserted into the optical plug receiving recess 2a of the receptacle 10 from the top side as viewed in FIG. 10 and fitted and held in place in the fiber receiving bore 11a of the sending side optical fiber accommodating tube 11 by means of a sending side fiber ferrule 21. Likewise, a receiving side optical fiber 32 is fitted into the fiber receiving bore 12a of the receiving side optical fiber accommodating tube 12 from the top side and held therein in place by means of a receiving side fiber ferrule 22.

The apertures 13a, 13b extending through the bottom wall 3 of the receptacle 10 in the present invention have a diameter large enough to receive the optically functional sections 81, 82 of the optical coupling component 9 and are in communication at their upper ends with the fiber receiving bores 11a, 11b, respectively.

Figure 10B:
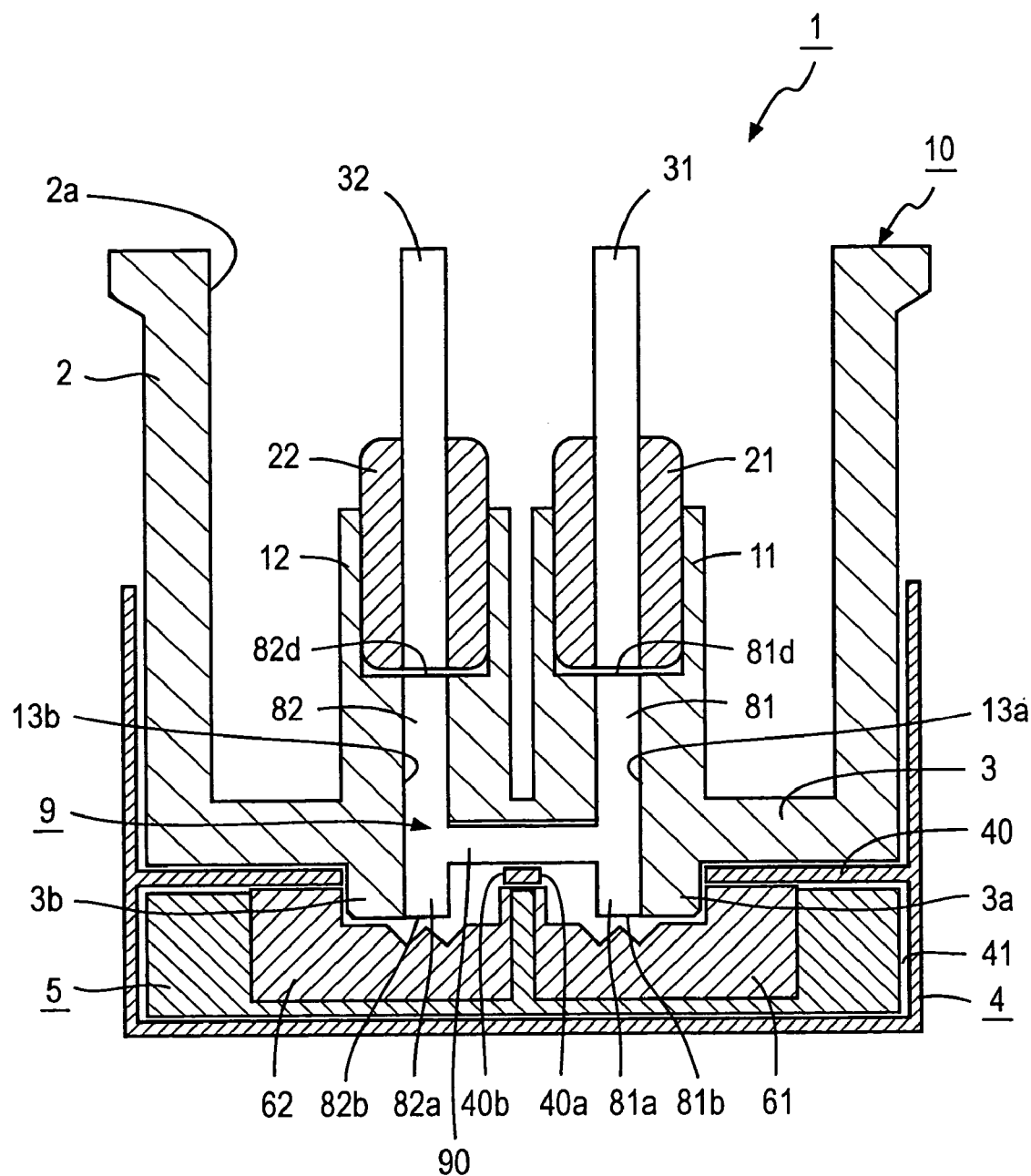
FIG. 10B showing the connector in a state after assembled.
Figure 11A:
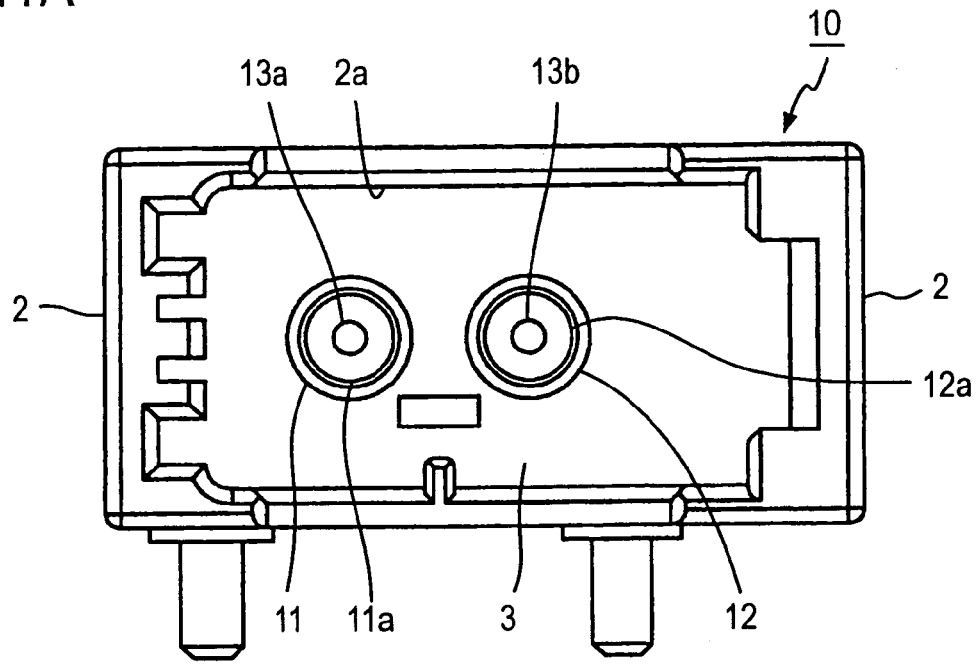
FIG. 11A being a front view of the receptacle having the optical coupling component fitted therein as viewed from the optical fiber side.
Figure 11B:
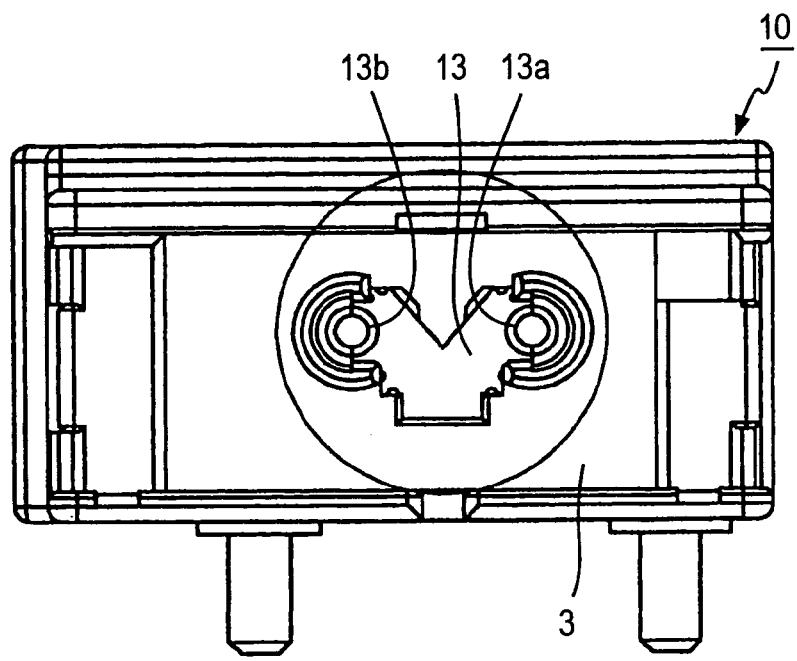
FIG. 11B being a front view as viewed from the receptacle side where the optical coupling component is inserted.
Figure 11C:
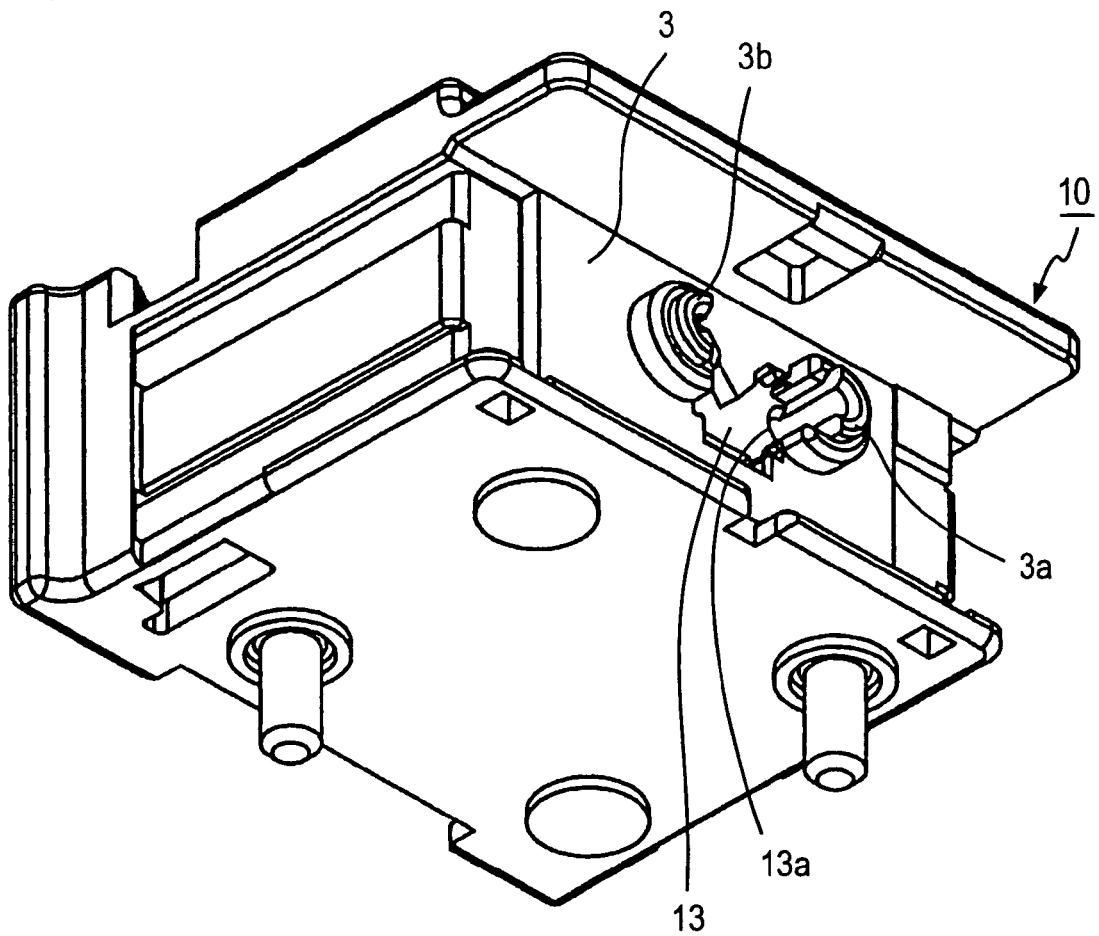
FIG. 11C being a perspective view.
Figure 11D:
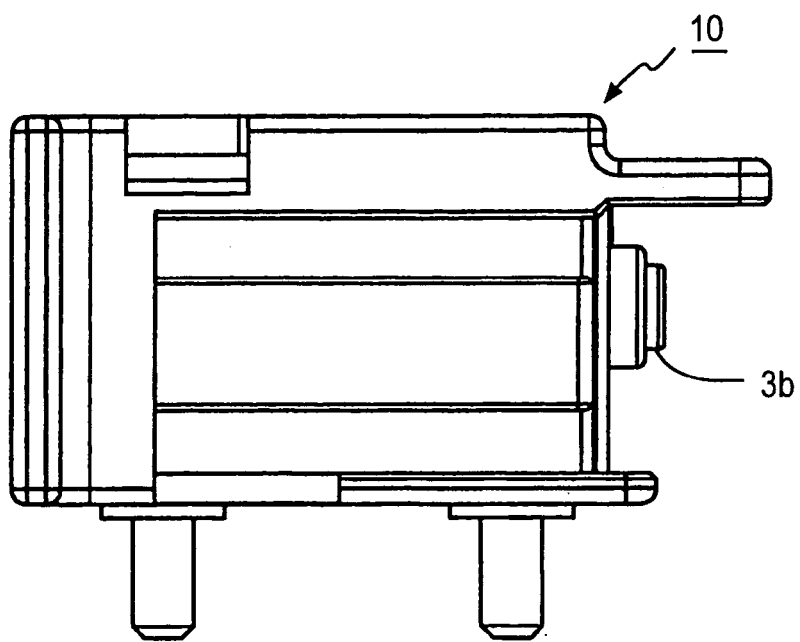
FIG. 11D being a side view.

The fiber side end portion 81c of the sending side optically functional section 81 of the optical coupling component 9 shown in FIG. 1 is inserted upwardly from outside of the bottom wall 3 (from the underside of the bottom wall 3 as viewed in FIG. 10A) into the aperture 13a such that the tip end 81d is positioned so as to oppose the sending side optical fiber 31 fitted in the sending side optical fiber accommodating tube 11 (see FIG. 10B) while the fiber side end portion 82c of the receiving side optically functional section 82 is likewise inserted upwardly from outside of the bottom wall 3 into the aperture 13b such that the tip end 82d is positioned so as to oppose the receiving side optical fiber 32 fitted in the receiving side optical fiber accommodating tube 12 until the joint section 90 of the optical coupling component 9 is received in the recess 13, as shown in FIGS. 8A and 10B.

The bottom wall 3 of the receptacle 10 has projections 3a, 3b extending outwardly (downwardly as viewed in FIG. 10A) from its outer surface. The projections 3a, 3b are shaped so as to surround the cylindrical perimeters of the end portion 81a of the optically functional section 81 on the light-emitting element side and the end portion 82a of the optically functional section 82 on the light-receiving element side, respectively around their half circumferences (see FIGS. 8A, 10B and 11C).

Upon the receptacle 10 being fitted in the shield cover 4, the light-emitting element side end portion 81a of the optically functional section 81 and the light-receiving element side end portion 82a of the optically functional section 82 surrounded by the projections 3a, 3b, respectively are inserted in the openings 40a, 40b of the shield cover 4 so that the tip ends 81b and 82b of the optically functional sections are positioned to oppose the light-emitting element 61 and the light-receiving element 62, respectively.

As is seen from FIG. 8A illustrating the optical coupling component 9 fitted in the receptacle 10, the recess 13 is so shaped as to be generally complementary with the outer contour of the optical coupling component 9. The recess 13 is formed on its inner wall surface (indicated in bold lines in FIG. 8A) with ridges 14 (six in this example) of a semispherical shape in cross-section extending in the direction of the depth of the recess 13 (direction perpendicular to the plane of the drawing in FIG. 8A).

The optical coupling component 9 is press-fitted and held in place in the recess 13 such that these six ridges 14 are compressed against the wall of the recess. It is also to be noted that the optical coupling component 9 is positioned in place within the recess 13 by means of the body portion 90' of the joint section.

It should be noted here that a sending side optical signal emitted from the light-emitting element 61 enters the light-emitting element side end portion 81a of the sending side optically functional section 81. The end portion 81a of the sending side optically functional section 81 is provided at its tip end with a collimating lens 81b Thus, the incident sending side optical signal is converged by the collimating lens 81b propagates through the sending side optically functional section 81, and is converged by a collimating lens 81d formed on the tip of the fiber side end portion 81c of the sending side optically functional section 81 before going out of the section and enters the core end face of the sending side optical fiber 31. Thereafter, the sending side optical signal passes through the sending side optical fiber 31 and is sent out to the outside.

Reversely, a receiving side optical signal incoming through the receiving side optical fiber 32 from the outside is converged by a collimating lens 82d formed on the tip of the fiber side end portion 82c of the receiving side optically functional section 81 before entering the receiving side optically functional section 82, and then enters and is received by the light-receiving element 162 after being converged by a collimating lens 82b formed on the tip of the end portion 82a of the optically functional section adjacent the light-receiving element.

The optical coupling component 9 according to the first embodiment is configured such that the surface areas of the joint regions of the joint end portions 91, 91' of the joint section 90 needed to form the pair of optically functional sections in an integral form where the joint end portions adjoin the side walls of the optically functional sections are reduced as compared with those of the earlier technique, whereby the amount of light which may leak through the joint section is suppressed to thereby enhance the optical transmission efficiency. Consequently, it is to be appreciated that an optical connector utilizing such optical coupling component may also enhance the optical transmission efficiency.

The cross-sectional areas (M×E) of the joint end portions 91, 91' between the optical coupling component 9 and the optically functional sections 81, 82 should be minimized so as to increase the optical transmission efficiency but it is restricted to be of a certain minimum size required to insure that the molten synthetic resin flows around within a mold, depending on the type of molding synthetic resin material used.

Figure 8B:
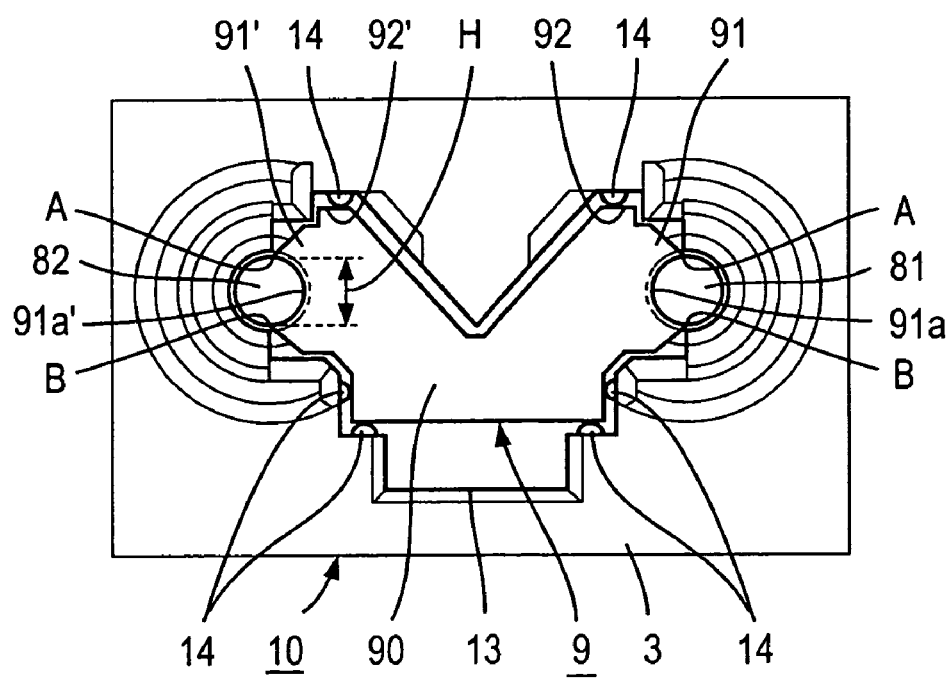
FIG. 8B showing another example of an optical connector in which a modified form of the optical coupling component shown in FIG. 8A is used.

This minimum size in the surface area may be determined by cut-and-try methods. Specifically, the smaller the cross-sectional areas of the joint end portions are made, the more the optical transmission efficiency may be enhanced. Conversely, however, the risk of causing a failure in the flow of resin during the injection molding of the resin may be commensurately increased. In order to improve the resin flow, it has been found that it is of use to configure the joint end portion 91 or 91' such that it has progressively increasing cross-sectional areas from the joint region toward the body portion thereof while the areas of the joint region 91a, 91a' remain unchanged, as illustrated in FIG. 8B. However, it is hard to determine during the design phase which of configurations varying from the configuration of FIG. 8A to that of FIG. 8B is the best, it is preferable that after molding prototypes of the optical coupling component, the cross-sectional area and shape of the joint end portions 91, 91' be determined by modifying by chipping the mold while inspecting the performances of the molded prototypes.

Accordingly, the recess 13 formed in the receptacle should be formed so as to provide a space large enough to accommodate even the configuration shown in FIG. 8B in which the vertical width H of the joint end portions is maximized. By doing so, should the flow of molten resin material encounter a stagnation while molding an optical coupling component using the mold shown in FIG. 8A, countermeasures for flow stagnation may be taken by gradually chipping the parts of the mold for the joint end portions to enlarge the cross-sectional areas of the joint end portions sufficiently to provide a normal flow.

A modified form of the first embodiment shown in FIG. 1 will be described with reference to FIG. 2. This modified form is fundamentally similar to the embodiment of FIG. 1, except that the V-shaped notch 93 used in the FIG. 1 embodiment is replaced by a generally U-shaped cut-out or notch 93' and that the mounting portions 92, 92' are omitted (that is, those parts of the joint section extending above the upper surfaces of the joint end portions 91, 91' have been cut away) so that the entire joint section 90 may be press-fitted into a receptacle. Again, the depth D (see FIG. 2B) of the generally U-shaped notch 93' of the joint section 90 from the top to the bottom thereof is so deep that the valley bottom of the notch 93' is below the level defined by a straight line L extending between the lowest points of the sending side and receiving side optically functional sections 81 and 82. As in this modified form, even if the joint section 90 is configured to have limited vertical dimensions over the entire length thereof, it may act as an optical guide. Consequently, there is a possibility that some amount of a sending side optical signal that has penetrated from the columnar sending side optically functional section 81 into the joint section may propagate through the joint section to cause a considerable cross-talk (see FIG. 2A). Nevertheless, since the U-shaped notch 93' is also formed to have a sufficient depth from the top of the joint section 90 that the valley bottom is located below the level defined by a straight line extending between the lowest points of the sending side and receiving side optically functional sections 81 and 82, any light which may have leaked from the sending side optically functional sections 81 into the joint section will take an extended path of leakage before it reaches the receiving side optically functional section 82, so that the leaked light will be attenuated during the process of propagating through the joint section 90 while diffusing, resulting in a reduction in cross-talk (see FIG. 2B).

Figure 3:
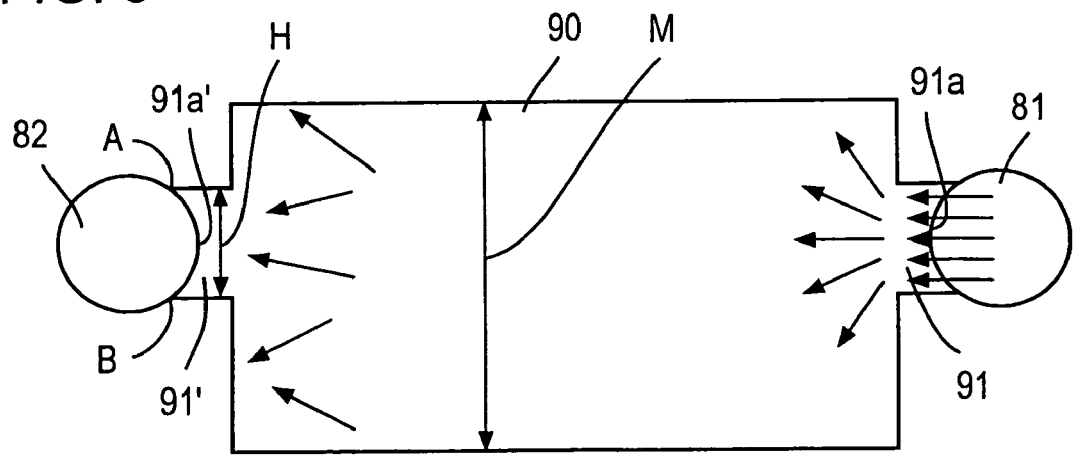
FIG. 3 is a diagram illustrating a second embodiment of the optical coupling component according to the present invention.
Figure 4A:
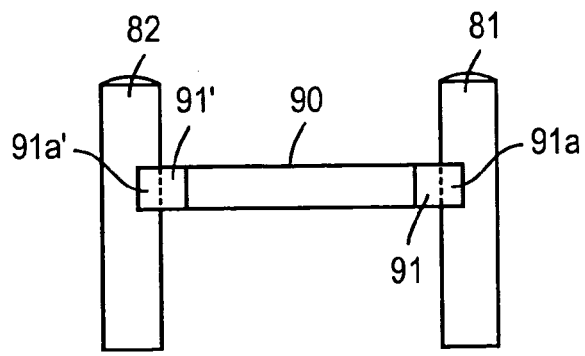
FIG. 4A being a plan view.
Figure 4C:
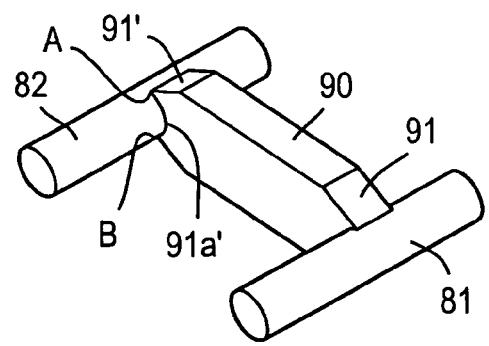
FIG. 4C being a perspective view.
Figure 4B:
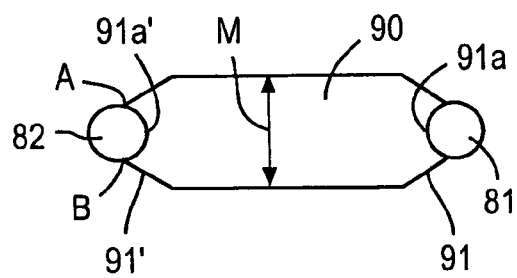
FIG. 4B being a front view.
Figure 4D:
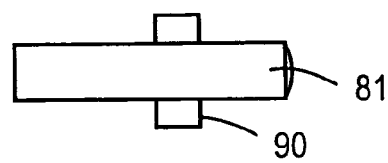
FIG. 4D being a side view.

Next, a second embodiment of the invention will be described with reference to FIG. 3. In this embodiment, the vertical dimension M of the joint section 90 is increased to enlarge the cross-sectional area, as compared to the surface areas of the joint regions 91a and 91a' between the joint end portions 91 and 91' and the columnar sending side optically functional section 81 and receiving side optically functional section 82, respectively, whereby any transmitted light that may have penetrated into the joint section 90 will be diffused through the enlarged joint section so that the amount of the light which may enter the receiving side optically functional section 82 will be correspondingly decreased to thereby reduce cross-talk.

A modified form of the second embodiment of FIG. 3 will be described with reference to FIG. 4. This modified form is again configured to increase the vertical dimension M (see FIG. 4B) of the joint section 90 to thereby enlarge the cross-sectional area, as compared to the surface areas of the joint regions 91a and 91a' between the joint end portions 91 and 91' and the sending side optically functional section 81 and receiving side optically functional section 82, respectively.

Figure 5:
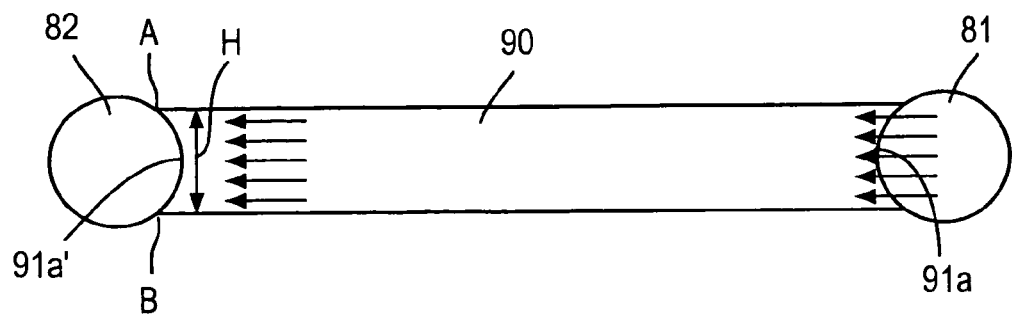
FIG. 5 is a diagram illustrating another modified form of the second embodiment shown in FIG. 3.
Figure 6A:
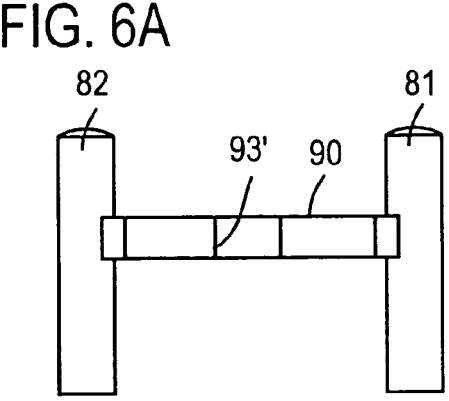
FIG. 6A being a plan view.
Figure 6B:
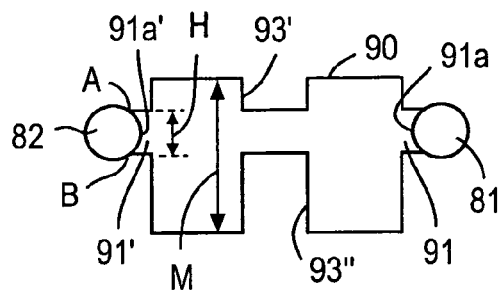
FIG. 6B being a front view.
Figure 6C:
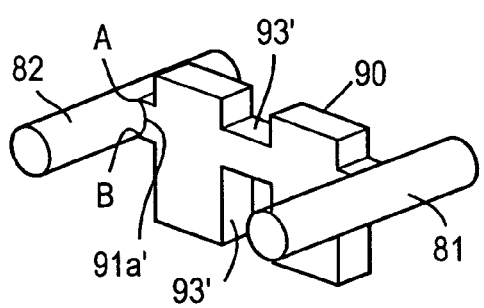
FIG. 6C being a perspective view.
Figure 6D:
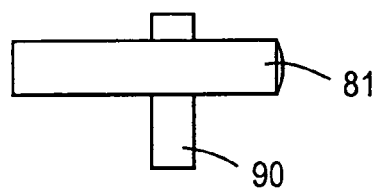
FIG. 6D being a side view.
Figure 7A:
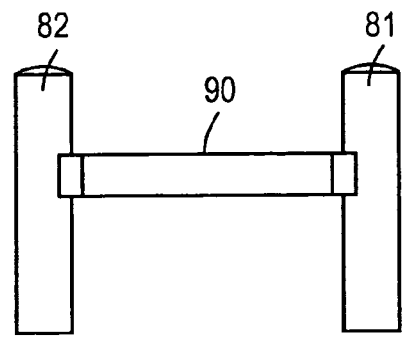
FIG. 7A being a plan view.
Figure 7B:
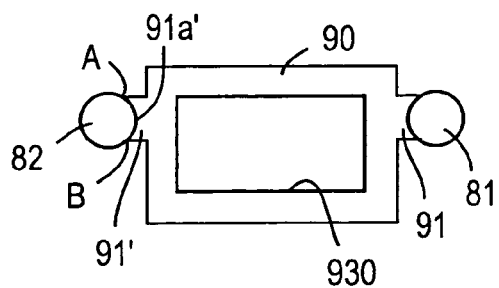
FIG. 7B being a front view.
Figure 7C:
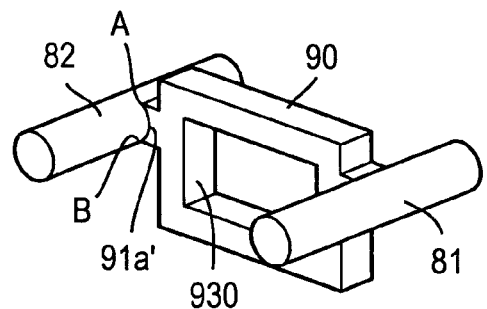
FIG. 7C being a perspective view.
Figure 7D:
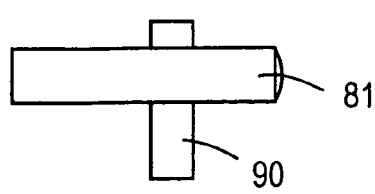
FIG. 7D being a side view.

Referring to FIG. 5, a further modified form of the second embodiment of FIG. 3 will be described. In an optical coupling component 9 for use in a two-way optical communication connector comprising a pair of columnar sending side optically functional section 81 and columnar receiving side optically functional section 82, and a joint section 90 molded integrally with the optically functional sections made from the same material as the material from which the optically functional sections are made, this modified form is constructed to simply join the joint section 90 with the side walls of the columnar sending side and receiving side optically functional sections 81, 82 around the circumferential length equal to or less than a half circumference of the columnar optically functional sections by means of the joint end portions 91, 91'. This modified form is again configured such that the joint regions of the joint section are joined with the side walls of the columnar sending side and receiving side optically functional sections 81, 82 around the circumferential length equal to or less than a half circumference of their columnar optically functional sections to thereby reduce the area of the joint region joining with the optically functional sections as compared to that of the earlier technique in which the joint section is joined with the optically functional sections around their whole circumferences. Consequently, the amount of light that would otherwise have leaked through the joint section may be reduced to thereby produce the effect of enhancing the optical transmission efficiency.

A third embodiment of the invention will be described with reference to FIG. 6. In this embodiment as well, as in the embodiment of FIG. 1, the optical coupling component 9 comprises a columnar sending side optically functional section 81, a columnar receiving side optically functional section 82, and a joint section 90 mechanically connecting the two optically functional sections. In this embodiment, the joint section 90 has U-shaped cut-outs or notches 93' and 93'' both cut in the center thereof from the top and bottom sides, respectively thereof, by means of which the joint section may be fitted and fixed in a receptacle in such a manner as to make the joint end portions of the joint section and the two optically functional sections free of (out of contact with) the receptacle. It will be appreciated that in this embodiment as well, the amount of light that would otherwise have leaked through the joint section may be reduced to enhance the optical transmission efficiency and additionally that any light which may have leaked from the sending side optically functional sections 81 into the joint section 90 will follow an extended cross-talk path before it reaches the receiving side optically functional section 82, so that the leaked light will be attenuated during the process of propagating through the joint section 90 while diffusing, resulting in a reduction in cross-talk.

A modified form of the third embodiment of FIG. 6 will be described with reference to FIG. 7. This modified form is similar to the embodiment of FIG. 1, except that in place of the notch 93 in FIG. 1, an opening 930 square in cut-out shape is formed in the center of the joint section 90. The joint section 90 is molded integrally with the columnar sending side optically functional section 81 and the columnar receiving side optically functional section 82 from the same material as the material and made from the same material as that from which those optically functional sections are made, and it is fixed in a receptacle by means of the square opening 930 formed through in its center.

Figure 9A:
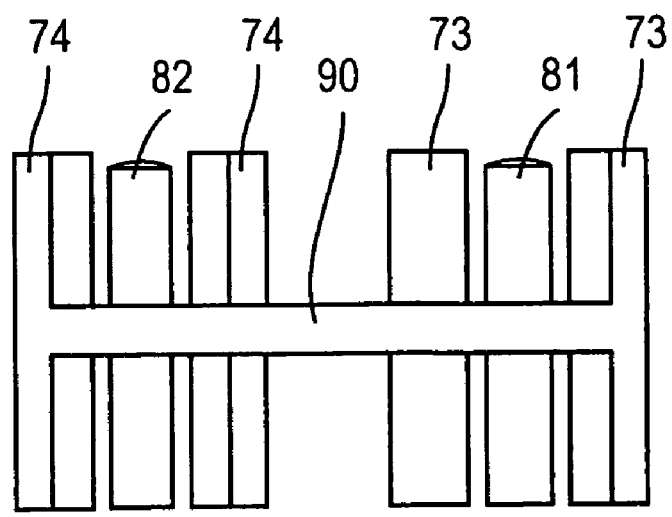
FIG. 9A being a plan view.
Figure 9B:
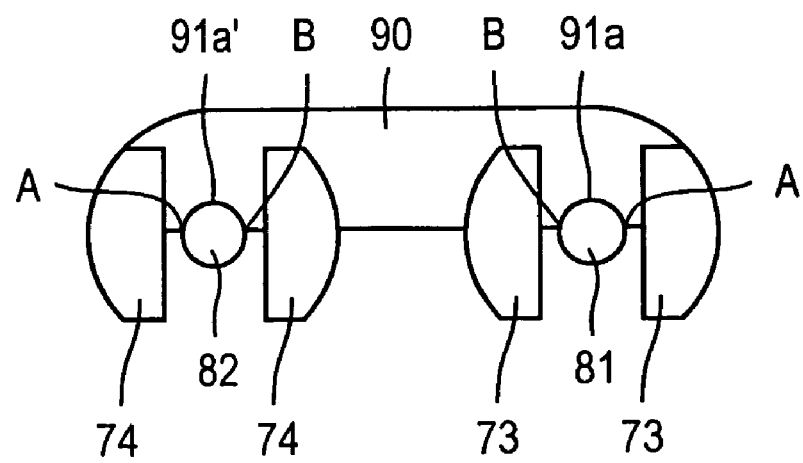
FIG. 9B being a front view.

A fourth embodiment will be described with reference to FIG. 9. This is an optical coupling component for use in an optical communication connector including a joint section 90 molded integrally with a columnar sending side optically functional section 81 and a columnar receiving side optically functional section 82 in which the joint section 90 is provided with additional portions so formed as to leave a portion of the perimeter of the columnar cross-section of each of the optically functional sections exposed. As is apparent from the drawing, the optical coupling component of this embodiment is configured such that the circumferential length (the arcuate length from the point A to the point B in FIG. 9B) of the joint regions 91a, 91a' of the joint section 90 circumferential of the side walls of the columnar optically functional sections where the joint section adjoins the outer peripheral surfaces of the optically functional sections is equal to or less than a half circumference of the optically functional sections. Additionally, it should be understood that while this optical coupling component has sleeves 73, 74 added thereto as used in the earlier technique, the effect of improving the optical transmission efficiency over the earlier technique is not impaired since the circumferential length of the joint surfaces is limited. Further, it should be noted that when constructing an optical connector using the optical coupling component of this embodiment, the apertures 13a, 13b formed through the bottom wall 3 should be large enough to pass these sleeves therethrough, as illustrated in the earlier technique.

INDUSTRIAL UTILITY

From the foregoing, it will be appreciated that the present invention provides an optical coupling component capable of improving the optical transmission efficiency and reducing cross-talk as compared to the earlier technique and an optical connector using such optical coupling component, and can be put to effective use in the field of the two-way optical communication.

What is claimed is:

1. An optical coupling component for use in a two-way optical communication connector comprising:

a columnar sending side optically functional section and a columnar receiving side optically functional section in a pair, both made from optically transparent synthetic resin material, and a joint section integrally molded with said optically functional sections and made from the same material as the material from which said optically functional sections are made so that said pair of said optically functional sections are mechanically joined to each other into one piece by means of said joint section, wherein:

said joint section has a body portion and opposite joint end portions, and each of the joint end portions has a joint region adjoining a circumferential surface of the corresponding columnar optically functional section, each of the adjoining joint regions adjoins the corresponding columnar optically functional section in a circumferential direction of the corresponding columnar optically functional section for a length less than or equal to half the circumference of the corresponding columnar optically functional section, and each of said joint regions of said end portions of said joint section has a vertical width H that is less than a vertical width M of said joint section.

2. The optical coupling component according to claim 1, wherein said body portion of said joint section has a generally V-shaped or U-shaped notch in a central portion thereof with an apex lower than a level defined by a straight line extending between the lower sides of said two optically functional sections.

3. The optical coupling component according to claim 1, wherein said body portion of said joint section has generally U-shaped notches in a central portion thereof cut in from the top and bottom edges thereof so that said body portion has a vertically narrowed central portion defined between facing bottoms of said notches.

4. The optical coupling component according to claim 2 in an optical connector, the optical connector further comprising:

a light-emitting element and a light-receiving element; and a connector body for housing therein said light-emitting and light-receiving elements and said optical coupling component; wherein said columnar sending side and receiving side optically functional sections of said optical coupling component are adapted to establish optical coupling between said light emitting element and said light receiving element on one hand and a sending side optical fiber and a receiving side optical fiber attached to an optical plug on the other hand, respectively.

5. The optical coupling component according to claim 3 in an optical connector, the optical connector further comprising:

a light-emitting element and a light-receiving element; and a connector body for housing therein said light-emitting and light-receiving elements and said optical coupling component; wherein said columnar sending side and receiving side optically functional sections of said optical coupling component are adapted to establish optical coupling between said light emitting element and said light receiving element on one hand and a sending side optical fiber and a receiving side optical fiber attached to an optical plug on the other hand, respectively.

6. The optical coupling component according to claim 2 in an optical connector, the optical connector further comprising:
   a light-emitting element and a light-receiving element; and
   a connector body including a wall which has
      a sending side optical fiber accommodating tube in which a sending side optical fiber attached to an optical plug is fitted,
      a receiving side optical fiber accommodating tube in which a receiving side optical fiber attached to said optical plug is fitted,
      a recess formed therein in which said optical coupling component is fitted, and through-apertures formed therethrough extending from said recess into communication wit said optical fiber accommodating tubes;
   wherein said optical coupling component is inserted and fixed in said recess while said optically functional sections are inserted in said through-apertures in a manner such that one ends of said optically functional sections are positioned in opposition to said light-emitting element and light-receiving element mounted in said connector body while the other ends of said optically functional sections are positioned within said through-apertures in opposition to said optical fibers fitted in said optical fiber accommodating tubes.

7. The optical coupling component according to claim 3 in an optical connector, the optical connector further comprising:
   a light-emitting element and a light-receiving element; and
   a connector body including a wall which has
      a sending side optical fiber accommodating tube in which a sending side optical fiber attached to an optical plug is fitted,
      a receiving side optical fiber accommodating tube in which a receiving side optical fiber attached to said optical plug is fitted,
      a recess formed therein in which said optical coupling component is fitted, and through-apertures formed therethrough extending from said recess into communication with said optical fiber accommodating tubes:
   wherein said optical coupling component is inserted and fixed in said recess while said optically functional sections are inserted in said through-apertures in a manner such that one ends of said optically functional sections are positioned in opposition to said light-emitting element and light-receiving element mounted in said connector body while the other ends of said optically functional sections are positioned within said through-apertures in opposition to said optical fibers fitted in said optical fiber accommodating tubes.

8. An optical connector comprising:
   a light-emitting element and a light-receiving element;
   the optical coupling component according to claim 1 2 3; and
   a connector body for housing therein said light-emitting and light-receiving elements and said optical coupling component,
   wherein said columnar sending side and receiving side optically functional sections of said optical coupling component are adapted to establish optical coupling between said light emitting element and said light receiving element on one hand and a sending side optical fiber and a receiving side optical fiber attached to an optical plug on the other hand, respectively.

9. An optical connector comprising:
   a light-emitting element and a light-receiving element;
   the optical coupling component according to claim 1, 2 or 3; and
   a connector body including a wall which has
      a sending side optical fiber accommodating tube in which a sending side optical fiber attached to an optical plug is fitted,
      a receiving side optical fiber accommodating tube in which a receiving side optical fiber attached to said optical plug is fitted,
      a recess formed therein in which said optical coupling component is fitted, and
      through-apertures formed therethrough extending from said recess into communication with said optical fiber accommodating tubes,
   wherein said optical coupling component is inserted and fixed in said recess while said optically functional sections are inserted in said through-apertures in a manner such that one ends of said optically functional sections are positioned in opposition to said light-emitting element and light-receiving element mounted in said connector body while the other ends of said optically functional sections are positioned within said through-apertures in opposition to said optical fibers fitted in said optical fiber accommodating tubes.

* * * * *